United States Patent
Carniato et al.

(10) Patent No.: US 10,441,976 B2
(45) Date of Patent: Oct. 15, 2019

(54) LUMP SEGREGATING SLURRY FEED DIFFUSER

(71) Applicant: SYNCRUDE CANADA LTD. in trust for the owners of the Syncrude Project as such owners exist now and in the future, Fort McMurray (CA)

(72) Inventors: Michael Carniato, Sherwood Park (CA); Dan Wolfe, Edmonton (CA); Ron Cleminson, Fort McMurray (CA)

(73) Assignee: SYNCRUDE CANADA LTD., Fort McMurray (CA), in trust for the owners of the Syncrude Project as such owners exist now and in the future (*) Notice: Subject to any disclaimer, the term of this patent is extended or adjusted under 35 U.S.C. 154(b) by 0 days.

(21) Appl. No.: 15/877,659

(22) Filed: Jan. 23, 2018

(65) Prior Publication Data

US 2019/0224718 A1 Jul. 25, 2019

(51) Int. Cl.
*B07B 1/08* (2006.01)
*B07B 1/22* (2006.01)
*B01D 33/11* (2006.01)
*B07B 13/05* (2006.01)
*B07B 13/16* (2006.01)

(52) U.S. Cl.
CPC ............ *B07B 1/08* (2013.01); *B01D 33/11* (2013.01); *B07B 1/22* (2013.01); *B07B 13/05* (2013.01); *B07B 13/16* (2013.01)

(58) Field of Classification Search
CPC .. B07B 1/08; B07B 1/22; B07B 13/05; B07B 13/16; B01D 33/11

USPC .............................. 209/12.1, 13, 17, 287, 288
See application file for complete search history.

(56) References Cited

U.S. PATENT DOCUMENTS

| | | | | |
|---|---|---|---|---|
| 2,322,017 A | * | 6/1943 | Hartman | B01D 21/00 210/703 |
| 4,507,202 A | | 3/1985 | Nord et al. | |
| 5,273,162 A | * | 12/1993 | Riherd | B03B 5/26 209/13 |
| 5,560,493 A | * | 10/1996 | Perry | B01D 35/06 209/214 |
| 6,962,199 B1 | * | 11/2005 | Tjeenk Willink | B01D 45/16 166/265 |

(Continued)

FOREIGN PATENT DOCUMENTS

| | | |
|---|---|---|
| CA | 2008684 C | 11/1990 |
| CA | 2509966 A1 | 6/2005 |

(Continued)

*Primary Examiner* — Terrell H Matthews
(74) *Attorney, Agent, or Firm* — Bennett Jones LLP

(57) ABSTRACT

A feed diffuser for use in a rotating screen having drain holes is provided, comprising a flow chamber having an upstream end and a downstream end and defining a flow path for a slurry having solid material larger than the drain holes flowing between the upstream end and the downstream end; the flow chamber having an intermediate portion disposed between the upstream end and the downstream end; the intermediate portion having a first opening; the flow chamber having an inclined floor, the lowest point of the inclined floor being adjacent to the first opening; whereby the inclined floor is sufficiently inclined such that when the slurry flows down the flow path, the larger solid material is directed towards the first opening.

9 Claims, 4 Drawing Sheets

(56) References Cited

U.S. PATENT DOCUMENTS

| | | | |
|---|---|---|---|
| 9,694,390 B1 * | 7/2017 | Tsutsumi | B01D 33/11 |
| 2002/0194988 A1 * | 12/2002 | Betting | B01D 45/16 |
| | | | 95/29 |
| 2006/0273048 A1 | 12/2006 | Doyle et al. | |
| 2009/0301939 A1 | 12/2009 | Sorensen | |
| 2018/0056307 A1 * | 3/2018 | Pettersson | C12M 43/00 |

FOREIGN PATENT DOCUMENTS

| | | | | |
|---|---|---|---|---|
| CA | 2635333 A1 * | 12/2009 | | B02C 17/02 |
| CA | 2635333 A1 | 12/2009 | | |
| CA | 2871992 A1 | 12/2009 | | |
| CA | 2892505 A1 | 11/2015 | | |

* cited by examiner

LUMP SEGREGATING SLURRY FEED DIFFUSER

FIELD OF THE INVENTION

The present invention relates to a lump segregating slurry feed diffuser useful for delivering a slurry into a rotary screen. The feed diffuser is particularly useful when screening oil sand slurries.

BACKGROUND

Mined oil sand containing bitumen is generally slurried with a solvent such as water as part of an initial process for eventual removal of the bitumen from the oil sand. Oil sand is a type of bitumen deposit typically containing sand, water and very viscous oil (the bitumen). When the oil sand deposit is located relatively close below the ground surface, the oil sand is often extracted from the deposit by excavating down through the ground surface to where the oil sand deposit occurs and removing oil sand from the deposit with heavy machinery.

Clay lumps and rocks present in the oil sand ore body provide no value to an oil sands mining operator, however, the clay lumps and rocks must still be processed along with the oil sand lumps and, hence, are also introduced into the oil sand slurry. Unacceptably high bitumen losses result if oil sand slurry is screened prior to conditioning, as some of the undigested oil sand lumps will also be removed. Conditioning of oil sand slurry is conventionally achieved by hydrotransporting the oil sand slurry through a pipeline of a certain length, wherein lumps of oil sand are ablated or disintegrated, the released sand grains and separated bitumen flecks are dispersed in the water, the bitumen flecks coalesce and grow in size, and the bitumen flecks may contact air bubbles and coat them to become aerated bitumen.

However, during hydrotransport, not only do the oil sand lumps ablate, but the clay lumps also ablate, albeit at a slower rate, and the disturbed clay is the primary constituent of fluid fine tailings (FFT), which requires expensive post-treatment and re-handling. Further, it is also recognized that dissolving clay lumps are a significant constituent of the screened product (about ⅓ of the lumps are partly dissolved clays). Thus, excessive turbulence during the screening process can only have negative influence by creating more dissolved clays. Indeed, the downstream bitumen extraction process (e.g., gravity separation) is often impeded by 'gel-like' strata generated by the dissolved clays.

The rocks in the hydrotransport slurry also present negative value, since they damage piping and pump parts throughout the system, at a disproportionately high rate. Both the rock and clay lumps may increase bitumen losses in the coarse solids separation vessel, since they settle very quickly relative to smaller sand particles, and they are likely to drag down recoverable bitumen, and otherwise disturb the low-velocity zones required in any separation or desanding vessel that are required for high bitumen recovery rates.

Oil sand typically comprises about 85% solid material, and about 70% of the solids could be considered 'coarse'. Of the coarse solids, 1-2% are above 50 mm in size, and an additional 2-5% are between 10 mm and 50 mm in size. Currently, the top size, set by screens or sizers, is set in order to avoid blockage of downstream equipment such as pumps. However, in existing systems, with front-end sizing, the oil sand lump size cannot be optimally reduced, resulting in either heavy loss of feed bitumen, or expensive reject re-processing systems.

It has recently been proposed to screen oil sand slurry after conditioning of the oil sand slurry, i.e., ablation of the oil sand lumps to a desired size, but prior to complete ablation of the clay lumps. However, screening a slurry comprising clay lumps and rocks poses certain challenges, as the clay lumps and rocks tend to impede the free drainage of the oil sand slurry.

SUMMARY OF THE INVENTION

The present invention is directed to a feed diffuser for a rotary screen that is useful in separating clay lumps and rocks from a conditioned oil sand slurry. It has been discovered by the present applicant that when using conventional rotary screens, the rocks and clay lumps impede the free drainage of the oil sand slurry and clay-dissolving turbulence is generated, as the sandy liquid fraction of the flow seeks a path out the screen openings. This, in turn, can create a growing backlog of material or 'charge' which diminishes overall drainage efficiency.

Screening of post-conditioned oil sand slurry may result in three key benefits:
  interception of more of the tailings-forming clay lumps (which would otherwise dissolve);
  reduction of wear on downstream equipment; and
  improve extraction performance.

Thus, in one aspect, the present invention is directed to a feed diffuser for feeding a slurry such as conditioned oil sand slurry into an in-feed end of a rotating screen to improve the distribution of the feed and to segregate clay lumps and rocks to a defined path. More particularly, a feed diffuser comprises an inclined floor to segregate clay lumps and rocks to a defined path. By doing this, lumpy flow (clay lumps and rocks) is directed onto the screen in a vicinity having lowest differential velocity. In addition, a portion of non-lumpy flow is directed to a screen vicinity where passage of liquids is unhindered and allowed to freely descend downwards through the screen holes.

Hence, a feed diffuser for use in a rotating screen having drain holes is provided, comprising:
  a flow chamber having an upstream end and a downstream end and defining a flow path for a slurry having solid material larger than the drain holes flowing between the upstream end and the downstream end;
  the flow chamber having an intermediate portion disposed between the upstream end and the downstream end;
  the intermediate portion having a first opening; and
  the flow chamber having an inclined floor, the lowest point of the inclined floor being adjacent to the first opening;
whereby the inclined floor is sufficiently inclined such that when the slurry flows down the flow path, the larger solid material is directed towards the first opening.

In another aspect, the invention may comprise a rotary screen separator comprising a cylindrical screen defining a plurality of drain holes and an internally located feed diffuser comprising an inclined floor. In one embodiment, the inclined floor is inclined from the horizontal at a 5 to 15 degree angle. In another embodiment, the inclined floor comprises a plurality of individual tiles. In one embodiment, the cylindrical screen further comprises internal longitudinal ligaments for directing the clay lumps and rocks to a discharge end of the cylindrical screen. Thus, application of an oil sand slurry to the cylindrical screen and rotation of the screen results in liquid and smaller particles passing through the drain holes, while larger particles (e.g., clay lumps and rocks) are retained and expelled by physical action of the ligaments.

In another aspect, a method for screening an oil sand slurry containing clay lumps and rocks is provided, comprising depositing the oil sand slurry into an in-feed end of a rotary screen separator comprising a rotatable cylindrical screen defining a plurality of drain holes; separating the clay lumps and rocks from drain hole-sized material by advancing the clay lumps and rocks to an oversize discharge end of the cylindrical screen to reduce breakage of the clay lumps; and collecting the drain hole-sized material which has passed through the drain holes to produce a screened oil sand slurry.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
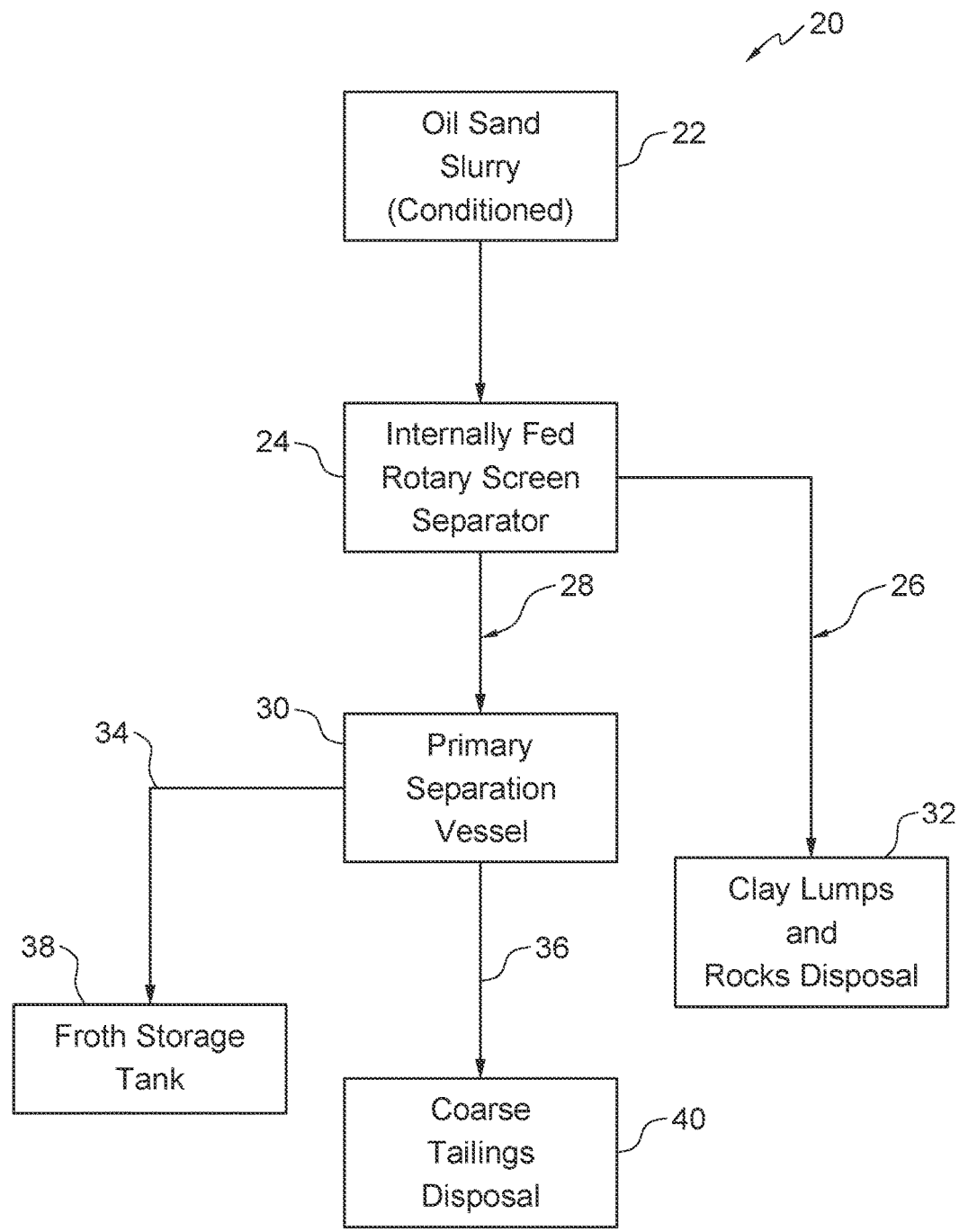
FIG. 1 is a block diagram and flow chart of an oil sand slurry separation system of the present invention.

FIG. 1 is a flow chart of an oil sand slurry separation system 20 according to the present invention. System 20 includes generally an oil sand slurry source 22, which slurry has been previously conditioned in a hydrotransport pipeline, a tumbler, etc., to break up/digest/ablate oil sand lumps to a desired size while keeping a portion of the clay lumps/rocks intact.

The conditioned oil sand slurry is then internally fed into an internally fed rotating screen 24 having an internal feed diffuser for directing clay lumps and rocks to one side of the rotating screen (i.e., the portion of the rotating screen having the lowest differential velocity) while allowing the digested oil sand slurry to more freely pass through the perforations of the rotating screen. The solids fraction 26 is typically discharged from the end of the rotating screen and comprises primarily clay lumps and rocks that have not passed through the perforations in the screen. The clay lumps and rocks are disposed of in a designated disposal site 32.

Liquid fraction 28 that freely flowed through the perforations of the rotating screen, which liquid fraction primarily comprises digested oil sand, is then directed to a primary separation vessel 30 where bitumen froth 34 is separated from the coarse tailings 36 comprising sand. The coarse tailings are deposited in a designated tailings disposal site 40 and the bitumen froth is stored in a froth storage tank 38 for further processing.

Figure 2:
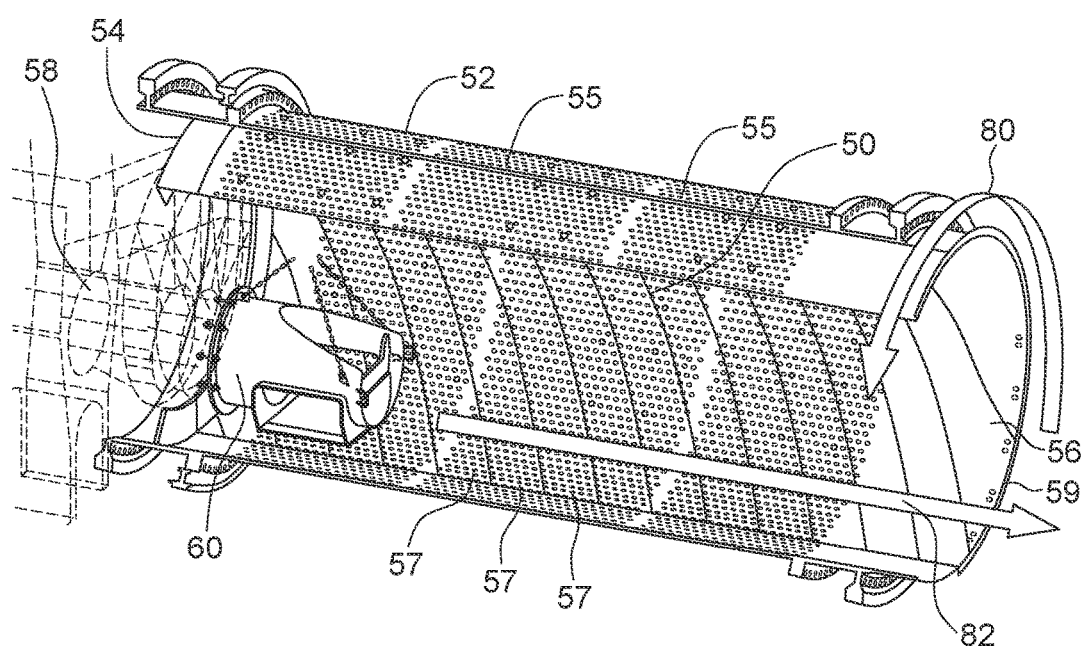
FIG. 2 is a cutaway schematic perspective view of the internals of a rotary screen separator having an inlet distribution tube and segregating feed diffuser of the present invention.

FIG. 2 is a cutaway schematic perspective view of the internals of a rotary screen separator useful in the present invention. The rotary screen separator comprises a rotatable cylindrical screen 52 having a feed end 54 and a discharge end 56, which screen may be slightly declined from the horizontal to promote movement of the larger particles to the discharge end 56. Cylindrical screen 52 may be comprised of a plurality of individual perforated screen cloths 55, each screen cloth defining a plurality of drain holes 57. The screen cloths 55 may be attached or applied to an inner surface of a structural member (not shown) such as a tubular space frame comprising trusses or a perforated tube having a plurality of perforations that line up with the plurality of drain holes 57 in each screen cloth 55. Each individual screen cloth 55 can be replaced as required due to wear and the like. It is understood, however, that rotatable cylindrical screen 52 can simply be a perforated tube.

Oil sand slurry is pumped into the internals or wetted surface of the cylindrical screen 52 via inlet conduit 58, which conduit is connected to an internal segregating feed diffuser 60 that is housed inside rotatable cylindrical screen 52 at its feed end 54. At the discharge end 56 of cylindrical screen 52 is a discharge outlet 59, where clay lumps and rocks exit the rotatable cylindrical screen 52. The rotatable cylindrical screen 52 may further comprise internal curvilinear or helical ligaments 50 for directing the clay lumps/rocks to the discharge end 56 for discharge. A perspective view of internal segregating feed diffuser 60 is shown in FIG. 3 and discussed in more detail below.

In operation, rotatable cylindrical screen 52 rotates counter clockwise as shown by arrow 80. Arrow 82 shows the flow of the slurry/clay lumps/rocks in the direction of the discharge end 56, whereby the slurry falls through the drains holes 57 in the screen and the clay lumps/rocks are discharged from discharge outlet 59.

Figure 3:
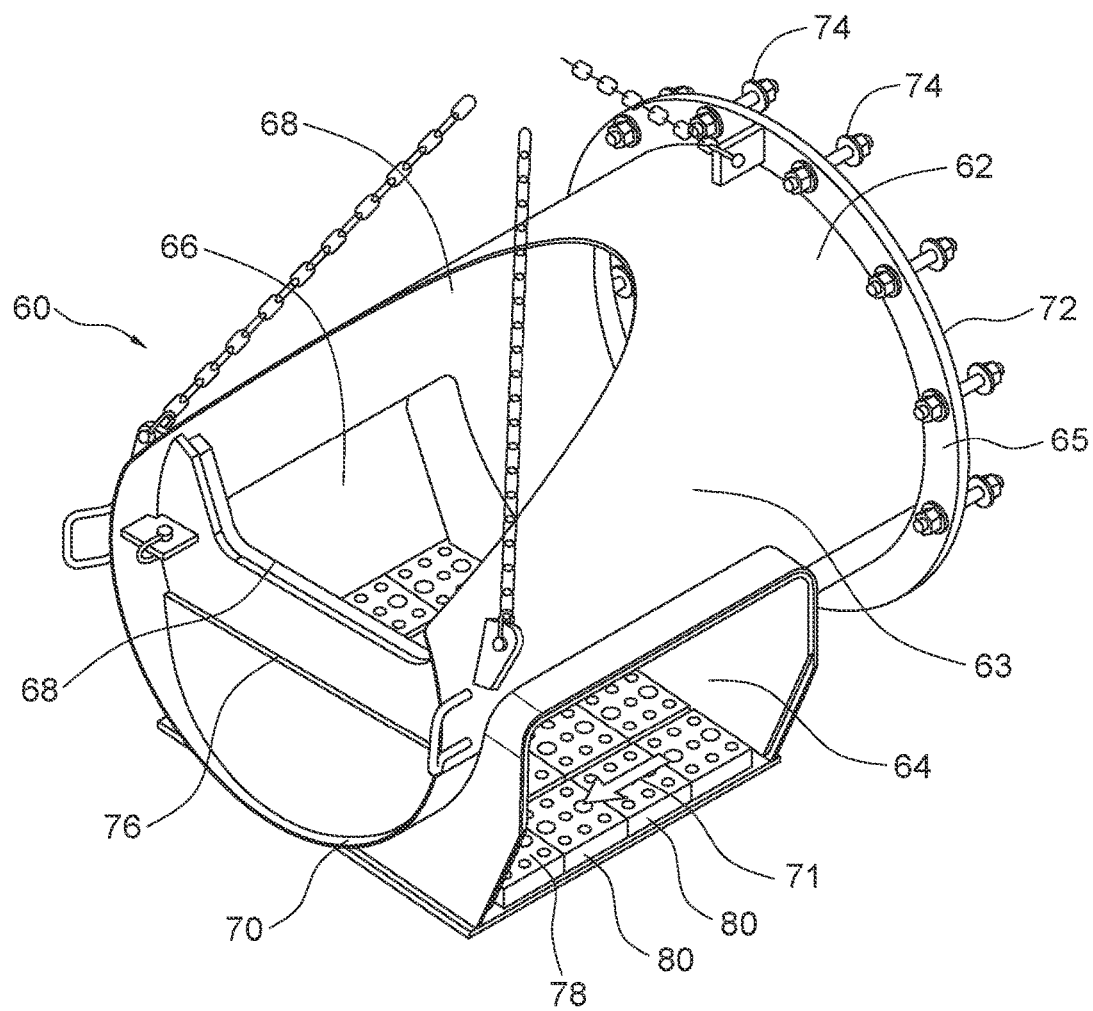
FIG. 3 is a perspective view of the segregating feed diffuser shown in FIG. 2.

With reference to FIG. 3, segregating feed diffuser 60 comprises a flow chamber 62 having an upstream end 72 and a downstream end 70 and defining a flow path 71 therethrough. The flow chamber 62 further comprises an intermediate portion 63 having a left side opening 64 and a right side opening 66. Slurry exits from both the left side opening 64 and the right side opening 66, however, the heavier material (clay lumps and rocks) is gravity biased to exit the lowermost opening and arrives onto the screen at the desired location, namely, where the relative velocity with the surface of the screen cloths 55 is lowest. Optionally, diffuser 60 further comprises top opening 68, which may be useful for visual inspection, improved maintenance access and reducing the overall weight of diffuser 60.

The upstream end 72 of feed diffuser 60 has a flange 65, which is designed to bolt onto inlet conduit 56 via a plurality of bolts 74. The downstream end 70 of diffuser 60 optionally comprises a lip 76 for controlling the flow of the oil sand slurry through the front opening 68 and onto the interior of rotatable cylindrical screen 54.

Flow chamber 62 of segregating feed diffuser 60 further comprises an inclined floor 78, which floor may be comprised of a plurality of individual tiles 80 for wear protection from erosion by the oil sand slurry. The tiles 80 reside in a high wear zone and are comprised of a material with improved wear performance. Further, individual tiles 80 can be easily replaced to extend the service life of diffuser 60. In one embodiment, inclined floor 78 is inclined towards the right side opening 66 at an inclination from the horizontal of about 5 to 15° so as to direct the clay lumps and rocks towards the left side opening 64 (the lowest point of floor 78) away from the remainder of the oil sand slurry, thus, allowing for substantially unfettered drainage of the oil sand slurry through the drain holes 57.

Figure 4:
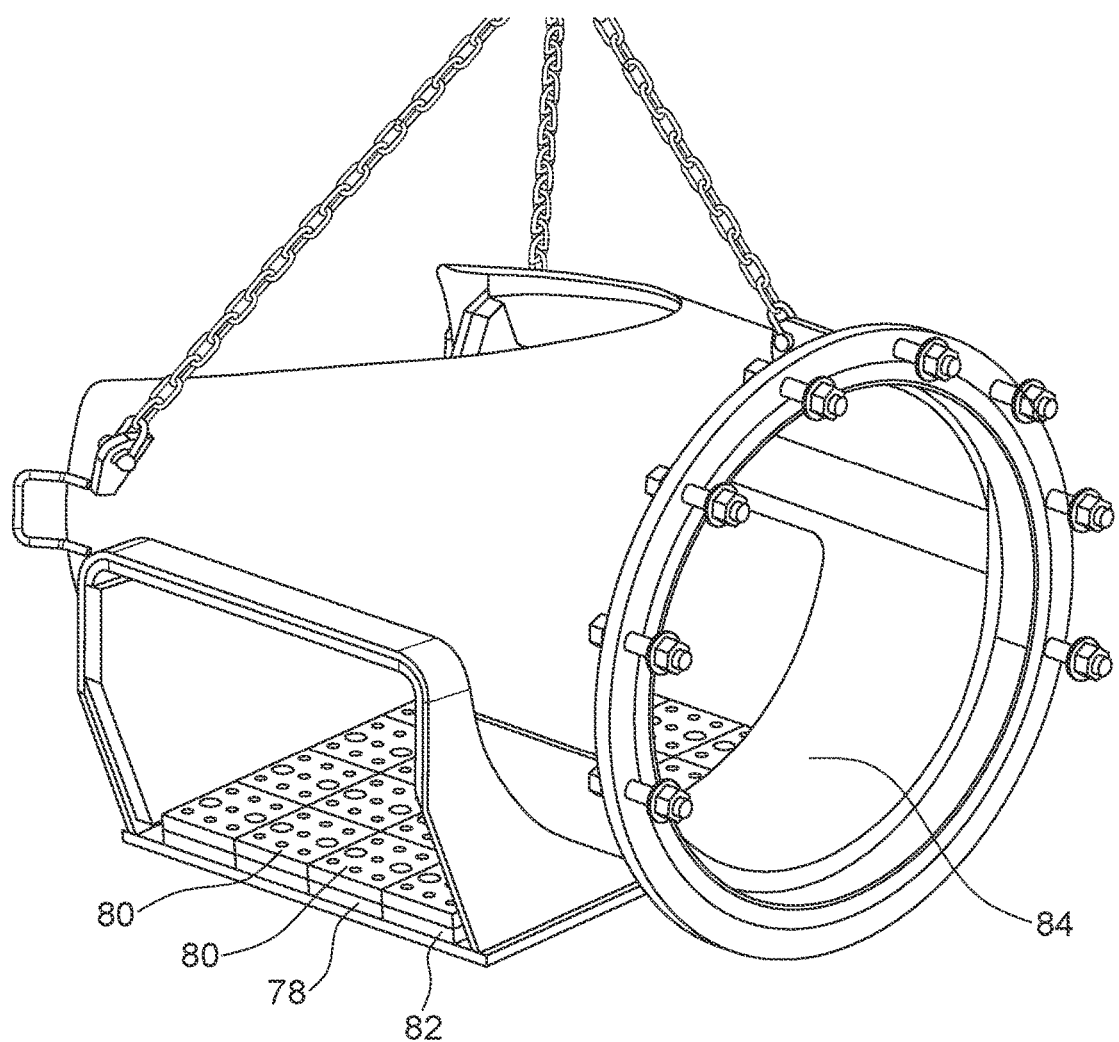
FIG. 4 illustrates the main portion of the segregating feed diffuser in phantom in order to show the slanted floor in more detail.

FIG. 4 illustrates the main portion of the segregating diffuser in phantom in order to show the inclined floor in more detail. The highest point of floor 78 is labelled 84 and the lowest point is labelled 82. Because the waste solids (e.g., clay lumps and rocks) are heavier than the carrying fluid slurry, the waste solids tend to reside at the bottom of the incoming slurry transport pipe. Thus, as the slurry arrives into diffuser 60 at a low velocity, the waste solids are automatically biased by gravity to exit the lower side opening.

When an oil sand slurry is introduced into the rotary screen separator, liquids and smaller particles suspended in the liquid will fall through the drain holes of the rotatable cylindrical screen. Larger solid materials which cannot pass through the drain holes will be retained by the screen and physically moved longitudinally front to back within the screen. Optionally, the screen may comprise ligaments, blades or other elements adapted to assist in moving larger objects front to back with rotation of the rotatable cylindrical screen.

The size and number of the drain holes may be chosen having regard to the desired drainage performance and sizing function of the rotary screen separator. For example, if a sizing cutoff of 30+ mm is desired, each drain hole may be circular and have a diameter of about 30 mm. In one embodiment, the drain holes may be circular, however, other shapes of drain holes may be effective.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

What is claimed is:

1. A feed diffuser for use in a rotating screen having drain holes, comprising:
    a flow chamber having an upstream end and a downstream end and defining a flow path for a slurry having solid material larger than the drain holes flowing between the upstream end and the downstream end;
    the flow chamber having an intermediate portion disposed between the upstream end and the downstream end;
    the intermediate portion having a first side opening and a second side opening opposite the first side opening;
    the flow chamber having an inclined floor, the lowest point of the inclined floor being adjacent to the first side opening;
    whereby the inclined floor is sufficiently inclined such that when the slurry flows down the flow path, the larger solid material is directed towards the first side opening and a solids-reduced slurry is directed towards the second side opening.

2. The feed diffuser as claimed in claim 1, wherein the inclined floor is inclined at an angle to the horizontal of between 5 to 15°.

3. The feed diffuser as claimed in claim 1, wherein the inclined floor comprises a plurality of individual tiles.

4. The feed diffuser as claimed in claim 1, wherein the upstream end comprises a flange for securing an inlet conduit to the diffuser.

5. The feed diffuser as claimed in claim 1, wherein the downstream end comprises a lip for slowing down the flow of the slurry.

6. A rotary screen separator comprising a cylindrical screen defining a plurality of drain holes and a feed diffuser as claimed in claim 1 disposed within the cylindrical screen.

7. A method of processing a slurry to separate larger solid material from a liquid, comprising the steps of:
(a) applying the slurry to a rotary screen separator as claimed in claim 6;
(b) collecting the liquid which passes through the screen; and
(c) expelling solids through one end of the rotating screen.

8. The method of claim 7 wherein the slurry is an oil sand slurry.

9. The method of claim 8 wherein the oil sand slurry has been conditioned by hydrotransport through a pipeline.

* * * * *